United States Patent

Ohkura et al.

Patent Number: 5,554,439
Date of Patent: Sep. 10, 1996

[54] COATING COMPOSITION AND COATING FILM COMPOSITION

[75] Inventors: Ken Ohkura, Tokyo; Satoru Matsuzaki, Iwata, both of Japan; Pekka J. Eskelinen, Pori, Finland

[73] Assignees: Dainichiseika Color & Chemicals Mfg. Co., Ltd., Tokyo, Japan; Kemira Osake Yhtio, Helsinki, Finland

[21] Appl. No.: 383,586

[22] Filed: Feb. 3, 1995

[51] Int. Cl.$^6$ ............................................. B32B 5/16
[52] U.S. Cl. ........................ 428/323; 428/331; 428/328; 523/200; 523/216; 524/431
[58] Field of Search .................... 428/323, 331, 428/328; 523/200, 216; 524/431

[56] References Cited

U.S. PATENT DOCUMENTS

| 4,499,143 | 2/1985 | Panush | 524/431 |
| 4,753,829 | 6/1988 | Panush | 428/328 |
| 4,849,283 | 7/1989 | Porter, Jr. et al. | 428/323 |
| 5,376,698 | 12/1994 | Sipsas et al. | 523/200 |

FOREIGN PATENT DOCUMENTS

| 01-185373 | 7/1989 | Japan | 523/216 |
| 6-033282 | 2/1994 | Japan . | |

Primary Examiner—Mark D. Sweet
Attorney, Agent, or Firm—Oblon, Spivak, McClelland, Maier, & Neustadt, P.C.

[57] ABSTRACT

Described is a coating composition comprising a liquid medium containing a titanium dioxide pigment and a coating film formation resin said titanium dioxide pigment being in the form of flaky or fin-like small pieces of silicon dioxide covered by titanium dioxide and having a diameter of 1 to 300 microns and a thickness of 0.001 to 1 micron, a considerable portion of said silicon dioxide being dissolved out from said titanium dioxide-coated silicon dioxide small pieces.

7 Claims, No Drawings

COATING COMPOSITION AND COATING FILM COMPOSITION

BACKGROUND OF THE INVENTION

1) Field of the Invention

This invention relates to coating compositions and coating film compositions.

2) Prior Art of the Related Art

Usual exterior coating compositions for the four—and two-wheel vehicles are roughly classified into solid coatings and metallic coatings. The solid coatings are prepared by adding a colored pigment. e.g., copper phthalocyanine pigment, quinacridone pigment, perillene pigment, etc. to a coating film. For the methallic coatings, aluminum or like metal powder or mica pigment is usually used together with the colored pigment noted above for the purpose of providing a sense of brightness.

The coating films formed by using the above solid and metallic coatings are required to have sufficient durability for protecting the base as well as ornamental character (i.e.. aesthetic character). Particularly, recent needs for attaching importance to the peculiarity of vehicles and the like are reflected by strong demands for diversification of coating films with respect to the color, ornamentality (aesthetic property), etc. of the top coat. Particularly, there is a stong demand for coating compositions for forming coating films with quality sense variations.

Titanium dioxide particles which are a typical white pigment, have heretofore been applied to many coating compositions because of excellent whiteness and concealing and weather-proof properties. Also, to meet recent coat color diversification demands there are coat color proposals which use far fine titanium dioxide particles compared to the conventional titanium dioxide particles. However, there is no example of study of variations of the coat color sense with particle shape variations. As a sole exception, titanium dioxide coat mica pigment is a pigment shape variation. This pigment, however, is mainly composed of mica, and therefore its coating films inevitably have reduced hiding property and color attachment power. In addition, in shelf time it sinks greatly because its particle diameter and weight are large.

SUMMARY OF THE INVENTION

The invention accordingly has an object of providing a coating composition and a coating film composition which permits formation of a coating film having a characteristic directivity in high brightness (high whiteness) coat color, permits the quality sense of a mica pigment coating film based on a three-coat two-bake coating process with a coating flim based on a two-coat one-bake coating process, and permits, when used together with a colored pigment, obtaining a coating film having mild color changes from highlight to shade.

The above object of the invention is attained by a coating composition, which comprises a liquid medium containing a titanium dioxide pigment and a coating film formation resin, the titanium dioxide pigment being in the form of flaky or fin-like small pieces of silicon dioxide covered by titanium dioxide and having a diameter of 1 to 300 microns and a thickness of 0.01 to 1 micron (hereinafter referred to as flaky titanium dioxide), a considerable portion of the silicon dioxide being dissolved out from the titanium dioxide-coated silicon dioxide small pieces, and a coating film composition comprising the same coating composition.

DETAILED DESCRIPTION OF THE INVENTION AND PREFERRED EMBODIMENTS

In view of the above problems in the prior art, the inventors have conducted extensive researches and investigations with an aim of developing a coating composition, which is while in color, has directivity in light reflection and does not sink greatly during shelf time, and found that the intention is met by a coating composition, containing a titanium dioxide pigment having a specific shape, i.e., flaky titanium dioxide.

It is also found that satisfactory and sufficient performance of the coating composition of the invention is obtainable by forming a colored base coat layer on a substrate by using the above coating composition and then forming a clear coat layer on the colored base coat or by forming a colored base coat layer as a first layer on a substrate, then forming a second colored base coat layer on the first base coat by using the above composition according to the invention and then coating a clear coat layer.

Now, the invention will be described in greater detail in conjunction with a preferred form of carrying it out. The flaky titanium dioxide used according to the invention may be those surface-treated as well known in the art. For example, it may be those commercially available under trade names of "TS–10" and "PS–10" (KEMIRA Inc., Finland).

The flaky titanium dioxide pigment noted above is in the form of flaky or fin-like small pieces silicon dioxide covered by a titanium dioxide and having a diamter of 1 to 300 microns and a thickness of 0.001 to 1 micron, with a considerable portion, e.g., 20 to 90% by weight, of the silicon dioxide being dissolved out from the titanium dioxide-coated silicon dioxide small pieces. According to the invention, it is particularly desirable to use flaky titanium dioxide with a diameter of 10 to 60 microns and a thickness of 0.01 to 0.5 micron.

By using a coating composition incorporating the above flaky titanium dioxide it is possible to form a coating film having peculiar directivity in the chromaticity, brightness and sense of brightness.

The coating film which is formed by coating the coating composition on a substrate, has tile following excellent features not possessed by coating films obtainable from the prior art coating compositions.

(a) The hiding property of the coating film is 3 to 5 times that of the prior art titanium dioxide coating mica pigment.

(b) The color attachment power of the coating film is 3 to 5 times that of the prior art titanium dioxide coating mica pigment.

(c) The coating film, unlike the prior art titanium dioxide coating mica pigment, is free from a sense of particles and has smooth directivity.

(d) Owing to the above characters, it is possible to obtain a quality sense by two-coat one bake process close to that of the coat color of the prior art titanium dioxide coating mica pigment based on the three-coat two-bake coating process.

(e) Owing to the above characters, the flaky titanium dioxide used according to the invention permits a coat color, which has strong directivity with high brightness color and also has a sense of brightness, to be obtained while maintaining the performance as a white pigment.

As the coloring pigment used together with the flaky titanium dioxide may be used colored pigments used for usual coating. Its specific examples are copper phthalocyanine pigment, quinacridone pigment, perillene pigment, anthraquinone pigment, metal complex pigment, transparent iron oxide pigment and carbon black.

The metal powder pigment used according to the invention may be aluminum powder, copper powder, stainless steel powder, etc. Among these pigments, aluminum powder is used most usually.

As the mica pigment may be used those well known in the art. Its examples are transparent pearl mica, colored mica, interference mica, etc.

As the coating film formation resin used according to the invention may be used those well known in the field of the coating. Its examples are acrylic acid resin, acrylmelamine resin, vinyl chloride —vinyl acetate resin, alkyd resin, polyester resin, polyurethane resin and amino resin. These examples of the coating film formation resin which can be used according to the invention are by no means limitative.

As the organic solvent for dissolving or dispersing the coating film formation resin may be used those well known in the art. Its examples are toluene, xylene, butyl acetate, methyl acetate, acetone, methylethyl ketone, methanol, ethanol, butanol and cyclohexane.

In the coating composition of the invention, the flaky titanium dioxide is used in an amount of 0.005 to 50 parts by weight, preferably 1 to 30 parts by weight, with respect to 100 parts by weight of the coating composition. If the amount is less than 0.005 part by weight, it is impossible to obtain the coating composition intended according to the invention. If the amount exceeds 50 parts by weight, on the other hand, the physical properties of the coating film are undesirably reduced although it is possible to obtain the coating composition intended according to the invention.

The amount of each of the colored, mica and metal powder pigments that may be incorporated according to the invention is 1.0 to 30 parts by weight with respect to 100 parts by weight of the coating composition. The total amount of one or more members of the group consisting of the colored, mica and metal powder pigments is 0.01 to 10,000 parts by weight with respect to 100 parts by weight of the flaky titanium dioxide.

If the total amount is less than 1.0 part by weight with respect to 100 parts by weight of the flaky titanium dioxide and less than 0.005 part by weight with respect to 100 parts by weight of the coating composition, a sufficient effect of providing the aesthetic sense can not be obtained. If the total mount exceeds 10,000 parts by weight with respect to 100 parts by weight of the flaky titanium dioxide and exceeds 50 parts by weight with respect to 100 parts by weight of the coating composition, the quality sense of the coating film is spoiled. Thus, in either case the coating composition intended according to the invention can not be obtained.

The coating composition of the invention may, if necessary, incorporate fillers, anti-charging materials, stabilizers, anti-oxidation agents, ultraviolet radiation absorbers. etc.

The coating composition of the invention may be prepared by adding the flaky titanium dioxide pigment and, if necessary, one or more pigments selected from the group consisting of the colored, mica and metal powder pigments to an organic solvent solution of the coating film formation resin and then stirring the mixture by using a sand mill or a high speed stirrer.

The coating composition obtained in this way, is coated by spray coating, electrostatic coating, flow coating, roll coating, etc. on a substrate, e.g., a metal substrate, a glass substrate, a plastic substrate, etc., provided with a base treatment if necessary, followed by drying and cross-linking hardening to obtain a colored coat layer.

It is possible to use the colored coat layer as a base coat layer and coat on this base layer a clear coat material, which is prepared by dissolving or dispersing a resin like the coating film formation resin noted above in an organic solvent, followed by drying and a subsequent heat treatment to obtain tile coating film.

Suitably, the coating composition of the invention is prepared by preliminarily preparing a case coating by adding the flaky titanium dioxide and colored, mica and metal powder pigments separately to an organic solvent solution containing the coating film formation resin and mixing a predetermined amount of each base coating.

The coating film obtainable by coating the coating composition of the invention on the substrate is excellent in the hiding property and also excellent in the ornamental property in that a directivity can be obtained even in a high whiteness (brightness) region.

More specifically, in a highlight (i.e.. high reflected light) region, the flaky titanium dioxide reflects more white light, while the sense of brightness is increased. On the other hand, in a shade region (with less reflected light) the white light reflection decreases a little, and the L value comes smaller, however, it is still permitting obtaining a coating film having sufficient whiteness (L value) for emphasizing the white coat color. In other words, it is a revolutional character that it is possible to emphasize the whiteness while providing directivity.

Further, since the flaky particles as the flaky titanium dioxide are very thin, even if their content in the coating film is high, the surface smoothness therefore is not lost, and it is possible to obtain a coating film having an excellent finish. This merit can solve the problem posed with the conventional flaky particles.

When ordinary titanium dioxide pigment having the usual particle shape is used, light scattering reflection is uniform, and the quality sense does not have substantial directivity.

The titanium dioxide-coated mica, on the other hand, is inferior in the hiding property and color attachment power, although it can satisfy the coating film quality sense with respect to the directivity. Thus, it permits difficult coat color design of the two-coat one-bake coating film in the high whiteness (i.e., high brightness) region. Further, in the coat color of the coating film obtained by the three-coat 2-bake coating process, the whiteness in the shade region is reduced although the sense of brightness can be satisfied.

In the case of the usual high whiteness coat color, using normal titanium dioxide coated mica there is a drawback that a coarse sense of brightness in highlight is taken as a sense of foreign matter.

Further, when the amount of titanium dioxide-coated mica content in the coating film is increased in the coat color for the purpose of providing high hiding property or high color attachment power, the smoothness of clear finish is reduced.

Further, with the important feature of the invention that the incorporation of the flaky titanium dioxide and one or more pigments selected from the group consisting of the colored, mica and metal powder pigments in the coating composition permits diversification of the coat color and ornamentality, particularly provision of variations of the quality sense of the coating film, it is possible to obtain further pronounced effects as follows.

In the case of incorporating the colored pigment together with the flaky titanium dioxide for a coat color, it is possible to obtain a sense of coat color which can not be expressed by incorporating the prior art brightness material (i.e., metal powder pigments and various mica pigments) and colored pigment. More specifically, the sense of the coat color based on the ordinary brightness material and colored pigment, light reflection is very high as an optical characteristic in the neighborhood of positive reflected light. The high light reflection is susceptible by the man's eyes as a "sense of glitter". In the shade region, light reflected from the ordinary brightness material is reduced, and therefore scattered reflected light from the colored pigment predominates.

In optical consideration, when direct sunlight or like intense parallel light flux is incident on the coating film, reflected light toward the light incidence side (negative reflected light) is mostly scattered light, and reflected light to the opposite side to the incident light, i.e., to the positive reflection side, has an increased depth of penetration, and flaky pigment surface reflection light is increased.

In the reflected light from the coating film containing the brightness material, the difference in light component between the positive and negative reflected light regions is pronounced. The flip-flop between these two regions and the light intensity difference in the positive reflected light region govern the quality sense of the coating film containing the brightness material.

On the other hand, in the coat color obtained by incorporating the flaky titanium dioxide and colored pigment, the difference in the light component between the positive and negative reflected light regions is somewhat mild, and also the light intensity difference in the positive reflected light region is mild. It is a featuring aspect, on the other hand, that the color change in the negative reflected light region is great compared to the coating film containing the ordinary brightness material. This effects comes from the strong performance of the flaky titanium dioxide particles as a coloring material in the coating film.

A further function to be added concerns the problem of sedimentation of pigment during the shelf time. Usually, the flaky pigment sinks during the shelf time because of its large particle diameter and heavy weight. In most cases, this problem is solved by the use of an anti-sinking agent or the like.

In contrast, the coating composition of the invention is less subject to sinking during the shelf time of the coating, which is a great feature of the invention.

The invention will be shown further specifically by giving its examples and contrast examples. Unless otherwise specified, parts and % are by weight.

EXAMPLE 1

TABLE 1

| Components of coating composition of the invention | amounts (parts) |
| --- | --- |
| Flaky titanium dioxide (TS-10) | 30 parts |
| Acrylic varnish (solid part: 60%) | 82 parts |
| Melamine varnish (solid part: 60%) | 34 parts |
| Solvesso 100/butyl acetate (7/3) mixed solvent | 30 parts |

EXAMPLE 2

TABLE 2

| Components of coating composition of the invention | amounts (parts) |
| --- | --- |
| Flaky titanium dioxide (PS-10) | 30 parts |
| Acrylic varnish (solid part: 60%) | 82 parts |
| Melamine varnish (solid part: 60%) | 34 parts |
| Solvesso 100/butyl acetate (7/3) mixed solvent | 30 parts |

EXAMPLE 3

TABLE 3

| Components of coating composition of the invention | amounts (parts) |
| --- | --- |
| Flaky titanium dioxide (TS-10) | 15 parts |
| Titanium dioxide (CR-97) (manufactured by Ishihara Sangyo)) | 15 parts |
| Acrylic varnish (solid part: 60%) | 82 parts |
| Melamine varnish (solid part: 60%) | 34 parts |
| Solvesso 100/butyl acetate (7/3) mixed solvent | 30 parts |

EXAMPLE 4

TABLE 4

| Components of coating composition of the invention | amounts (parts) |
| --- | --- |
| Flaky titanium dioxide (TS-10) | 28 parts |
| Copper Phthalocyanine Blue 5206 (manufactured by Dainichiseika Kogyo) | 2 parts |
| Acrylic varnish (solid part: 60%) | 82 parts |
| Melamine varnish (solid part: 60%) | 34 parts |
| Solvesso 100/butyl acetate (7/3) mixed solvent | 30 parts |

Contrast Example 1

TABLE 5

| Components of coating composition of Contract Example | amounts (parts) |
| --- | --- |
| Titanium dioxide (CR-97) | 30 parts |
| Acrylic varnish (solid part: 60%) | 82 parts |
| Melamine varnish (solid part: 60%) | 34 parts |
| Solvesso 100/butyl acetate (7/3) mixed solvent | 30 parts |

Contrast Example 2

TABLE 6

| Components of coating composition of Contract Example | amounts (parts) |
| --- | --- |
| Pearl White (manufactured by Mahl Inc.) | 30 parts |
| Acrylic varnish (solid part: 60%) | 82 parts |
| Melamine varnish (solid part: 60%) | 34 parts |
| Solvesso 100/butyl acetate (7/3) mixed solvent | 30 parts |

Contrast Example 3

In Contrast Example 3, a base coat is formed with the coating material used in Cntrast Example 1, and "Pearl White" used in Contrast Example 2 was coated to 2 to 5 microns as a second layer.

Contrast Example 4

TABLE 7

| Components of coating composition of Contract Example | amounts (parts) |
| --- | --- |
| Aluminum Pigment 7620NS (manufactured by Toyo Arumi) | 28 parts |
| Copper Phthalocyanine Blue 5206 | 2 parts |
| Acrylic varnish (solid part: 60%) | 82 parts |
| Melamine varnish (solid part: 60%) | 34 parts |
| Solvesso 100/butyl acetate (7/3) mixed solvent | 30 parts |

The coating materials in the above Examples 1 to 4 and Contrast Examples 1 to 4 were diluted with a thinner to a spray viscosity (14 seconds with Ford cup No. 4) and then coated by spraying on treated steel panels using an air spray gun. After 10 minutes of drying, clear (acrilic meramine) coating was made with an air spray gun. Further, after 15 minutes of drying at room temperature, the samples were hardened by baking at 140 for 30 minutes, thus obtaining steel panels.

Of these panels, the ornamental properties (i.e., aesthetic properties) such as brightness and degree of coloring and also the hiding property were measured or evaluated. The results are shown in Tables 8 and 9.

The geometrical metamerism of the coating film was shown in terms of measured values of changes in the brightness and chromaticity for various light reception angles with a fixed light incidence angle. Hiding property is also measured in film thickness.

The brightness was shown as calculated value of L* and the chromaticity as calculated value of $$C^* = [(a^*) + (b^*)]^{1/2}$$

That is, as for the geometrical metamerism of the coating film, chromaticity and brightness were measured by receiving at four different light reception angles of −70°, −30°, +10° and +40° with the light incidence angle fixed at −50° and the quality sense of the coating film was evaluated.

As for the hiding property, each coating composition noted above was spray coated on a panel coated in separate white and black colors, and the property was evaluated in terms of the thickness of dried and hardened film upon reaching of a film thickness, with which the boundary between the base white and black colors could no longer be determined.

TABLE 8

| | Hiding property | Light reception angle | Result of measurement L* value | C* value |
| --- | --- | --- | --- | --- |
| Ex. 1 | 45 μm | −70° | 89 | 2.3 |
| | | −30° | 92 | 2.4 |
| | | +10° | 98 | 2.7 |
| | | +40° | 119 | 2.6 |
| Ex. 2 | 65 μm | −70° | 85 | 2.4 |
| | | −30° | 89 | 2.3 |
| | | +10° | 100 | 2.7 |
| | | +40° | 135 | 2.9 |
| Ex. 3 | 26 μm | −70° | 90 | 2.1 |
| | | −30° | 92 | 2.5 |
| | | +10° | 98 | 2.6 |
| | | +40° | 112 | 2.4 |
| Ex. 4 | 36 μm | −70° | 72 | 22 |
| | | −30° | 83 | 30 |
| | | +10° | 94 | 33 |
| | | +40° | 109 | 38 |

TABLE 9

| | Hiding property | Light reception angle | Result of measurement L* value | C* value |
| --- | --- | --- | --- | --- |
| Cont. Ex. 1 | 21 μm | −70° | 92 | 2.3 |
| | | −30° | 94 | 2.4 |
| | | +10° | 93 | 2.9 |
| | | +40° | 97 | 2.4 |
| Cont. Ex. 2 | 180 μm | −70° | 78 | 4.5 |
| | | −30° | 82 | 4.7 |
| | | +10° | 90 | 5.9 |
| | | +40° | 130 | 5.7 |
| Cont. Ex. 3 | — | −70° | 83 | 5.2 |
| | | −30° | 85 | 4.6 |
| | | +10° | 100 | 2.7 |
| | | +40° | 139 | 2.9 |
| Cont. Ex. 4 | 11 μm | −70° | 68 | 16 |
| | | −30° | 72 | 21 |
| | | +10° | 103 | 28 |
| | | +40° | 149 | 33 |

As has been described in the foregoing, the coating composition of the invention permits formation of a coating film, which has a characteristic directivity in high brightness (or high whiteness) coat color. Also, it is possible to obtain a quality sense of a three-coat two-bake coating process coating film based on mica pigment by two-coat one bake process incorporating flaky titanium dioxide pigment.

Meanwhile, in coating film incorporating a colored pigment, it is possible to obtain coat color with mild color changes as changes from highlight to shade.

A particular feature is a coating film having geometrical metamerism in a shade region.

What is claimed is:

1. A coating composition comprising a liquid medium containing a titanium dioxide pigment and a coating film formation resin, said titanium dioxide pigment being in the form of flaky or fin-shaped small pieces of silicon dioxide covered by titanium dioxide and having a diameter of 1 to 300 microns and a thickness of 0.001 to 1 micron, 20 to 90% by weight of said silicon dioxide being dissolved out from said titanium dioxide-coated silicon dioxide small pieces.

2. The coating composition according to claim 1, which further contains at least one pigment selected from the group consisting of organic pigments and inorganic pigments.

3. A coating film composition comprising a base coat layer formed on a substrate and comprising the coating composition as claimed in claim 1, and a clear coat layer formed on said base coat layer.

4. A coating film composition comprising a colored base coat layer formed on a substrate and comprising the coating composition as claimed in claim 2, and a clear coat layer formed on said colored base coat layer.

5. A coating film composition comprising a colored base coat layer formed on a substrate, a second base coat layer formed on said colored base coat layer and comprising the coating composition as claimed in claim 1, and a clear coat layer formed on said second base coat layer.

6. A coating composition comprising a first colored coat layer formed on a substrate, a second colored base coat layer formed on said first colored coat base layer and comprising the coating composition as claimed in claim 2, and a clear coat layer formed on said second colored base coat layer.

7. The coating composition according to claim 2, wherein said organic pigments are phthalocyanine pigments, quinacridone pigments or perillene pigments, and said inorganic pigments are titanium dioxide, oxides of iron, metallic aluminum pigments or mica pigments.

* * * * *

UNITED STATES PATENT AND TRADEMARK OFFICE
CERTIFICATE OF CORRECTION

PATENT NO. : 5,554,439
DATED : Sep. 10, 1996
INVENTOR(S) : Ken OHKURA, et al.

It is certified that error appears in the above-indentified patent and that said Letters Patent is hereby corrected as shown below:

On the title page, Item [30], the Foreign Application Priority Data, is missing. It should read:

--[30]  Foreign Application Priority Data

Feb. 7, 1994  [JP] Japan.....33282/1994--

Signed and Sealed this

Third Day of December, 1996

Attest:

BRUCE LEHMAN

*Attesting Officer*     *Commissioner of Patents and Trademarks*